United States Patent [19]

Donnenberg et al.

[11] 4,315,527
[45] Feb. 16, 1982

[54] EXPANSION TANKS FOR PRESSURIZED FLUIDS AND DIAPHRAGMS THEREFOR

[75] Inventors: Leon Donnenberg, Levittown, N.Y.; Helmut J. Draxler, Cincinnati, Ohio

[73] Assignee: TMI Sales Corporation, Forest Hills, N.Y.

[21] Appl. No.: 111,551

[22] Filed: Jan. 14, 1980

[51] Int. Cl.³ .............................................. F16L 55/04
[52] U.S. Cl. ..................................... 138/30; 220/85 B
[58] Field of Search ................... 138/26, 30; 220/85 B

[56] References Cited

U.S. PATENT DOCUMENTS

| | | | |
|---|---|---|---|
| 2,300,722 | 11/1942 | Adams et al. | 138/30 |
| 2,324,701 | 7/1943 | Herman | 138/30 |
| 2,340,125 | 1/1944 | Huebner et al. | 138/30 |
| 2,371,632 | 3/1945 | Lippincott | 138/30 |
| 2,489,491 | 11/1949 | Johnson | 138/30 |
| 3,066,699 | 12/1962 | Peet | 138/30 |
| 3,080,119 | 3/1963 | Shutkufski | 138/30 X |

FOREIGN PATENT DOCUMENTS 948675  2/1964  United Kingdom .............. 220/89 B

*Primary Examiner*—James E. Bryant, III
*Attorney, Agent, or Firm*—Lawrence Rosen

[57] ABSTRACT

The diaphragm of the invention is for expansion tanks comprising a pair of shell halves and is for interposition between such shell halves to seal the joint between the shell halves and to anchor the diaphragm so as to divide the tank into a pair of chambers. The diaphragm includes a central sheet of elastomeric material terminating in a peripheral edge that includes an outer peripherally extending column integral with the central sheet and having a pair of integral flange elements and a central web element extending inwardly therefrom. Each of the flange elements is spaced from the central web element to form an annular slot therewith. The slots are dimensioned so as to releasably and sealingly receive the respective skirts of the shell halves.

6 Claims, 6 Drawing Figures

EXPANSION TANKS FOR PRESSURIZED FLUIDS AND DIAPHRAGMS THEREFOR

BACKGROUND OF THE INVENTION

The present invention relates to expansion tanks or accumulators of the type in which a flexible diaphragm is positioned across the interior of the tank to separate it into two or more compartments or chambers to be occupied by pressurized fluids. Generally one of the fluids is air and the other a liquid such as water or a hydraulic liquid such as a brake fluid.

Expansion tanks or accumulators of the type to which the present invention is directed are commonly incorporated in a system where fluctuations in pressure are normally anticipated. The expansion tank, as the name implies, serves to introduce an element of resiliency into the hydraulic circuit so as to be able to absorb the surges of pressure which can be expected to occur. At such times the increased hydraulic pressure is transmitted to the liquid within the liquid chamber of the tank, the volume of such chamber increasing and, by virtue of the diaphragm, compressing the air within the other chamber of the tank to effectively cushion the surge of pressure. The consequence is that the hydraulic system is safeguarded against sudden increases in hydraulic pressure which might otherwise cause substantial damage to the system or to sensitive components therein.

It has been conventional to construct the expansion tank of a pair of shell halves each of which may be hemispheric in configuration terminating in generally radially extending skirts or flanges. The peripheral edge of the diaphragm is given a configuration providing a protuberance in the form of a thickened bead that is complementary to a recessed portion formed in one or both of the shell skirts or flanges. The peripheral edge of the diaphragm is thus securable between the skirts of the shells to seal the joint therebetween. Frequently the joint so formed is maintained by means of a clamping ring adapted to apply a closing force to the mating skirt or flange sections of the shells. Such a construction is disclosed, for example, in U.S. Pat. No. 2,394,401 issued Feb. 5, 1946 to J. W. Overbeke. Typical also of conventional expansion tank construction is the device disclosed in U.S. Pat. No. 2,300,722 issued Nov. 3, 1942 to H. W. Adams et al. In the Adams patent the peripheries of the shell halves are shown as being drawn together by means of a series of circumferentially spaced bolts and nuts. The diaphragm, in structures such as those of Overbeke and Adams et al, thus serves to seal the joint between the shell halves of the tank and be anchored in one or both of the skirts or flanges.

Certain disadvantages are inherent in expansion tanks of the type shown in the Overbeke and Adams et al. patents and in the diaphragms utilized. One such disadvantage is the requirement that the peripheral flanges of the tank shell halves undergo special forming operations in order to provide the selected recess configuration for reception of the mating peripheral edge portion of the diaphragm. This, of course, results in increased manufacturing costs. Another disadvantage arises through extended use of the tank and diaphragm. It has been found that due to repeated flexure of the diaphragm under the influence of the pressures exerted in both chambers of the tank the bead or other protuberance of the peripheral edge of the diaphragm tends to become distorted resulting in a loose seating within the recess. This leads to a less than intended optimum sealing of the joint between the flanges of the shell halves and consequent leakage of fluid from the tank. Additionally, during periods when the diaphragm is stressed by a pressure surge the portion of its peripheral edge designed to serve as a sealing element frequently tends to be temporarily unseated thereby establishing communication between one or both of the pressurized chambers of the tank and the ambient environment so as to reduce the effectiveness of the seal.

In view of the foregoing it is one object of this invention to provide an improved diaphragm for an expansion tank for pressurized fluids which is capable of enhanced sealing of the joint between the shell halves of the tank.

It is another object of the invention to provide an expansion tank for pressurized fluids comprising a pair of shell halves that are sealable relative to each other by the peripheral edge of a diaphragm therewithin which shell halves include peripheral flanges of simplified construction.

It is still another object of this invention to provide an expansion tank of the character described which is capable of being stored and/or transported in an arrangement utilizing a minimum of space.

Other objects and advantages of the invention will become readily apparent to persons versed in the art to which the invention pertains from the ensuring description.

SUMMARY OF THE INVENTION

In accordance with the invention there is provided a diaphragm for an expansion tank for pressurized fluids which includes a central sheet of elastomeric material terminating in a peripheral edge. The peripheral edge is formed by an outer peripherally extending column which is integral with the central sheet from which extend a pair of integral flange elements and a central web element. The flange and web elements extend inwardly from the column, each of the flange elements being spaced from the central web element and forming an annular slot therewith.

In accordance with the invention there is also provided an expansion tank for pressurized fluids which includes first and second shell halves. Each of the shell halves has a central wall portion and a sidewall which at one extremity thereof merges into the central wall and at the other extremity terminates in a peripherally extending skirt that projects generally perpendicularly outwardly of the sidewall. An opening is formed in one of the shell halves for the passage of a liquid therethrough. An opening is formed in the other shell half for the passage of air therethrough. A diaphragm extends across the interior of the tank with its peripheral edge between the skirts of the tank shell halves. The diaphragm includes a central sheet of elastomeric material terminating in a peripheral edge formed by an outer peripherally extending column integral with the central sheet and from which extend a pair of integral flange elements and a central web element. The flange and web elements extend inwardly from the column with each flange element being spaced from the web element on opposed sides thereof so as to form respective annular slots therewith.

BRIEF DESCRIPTION OF THE DRAWINGS

In order that the invention may be more fully comprehended it will now be described, by way of example, with reference to the accompanying drawings in which.

DESCRIPTION OF THE PREFERRED EMBODIMENTS

Figure 1:
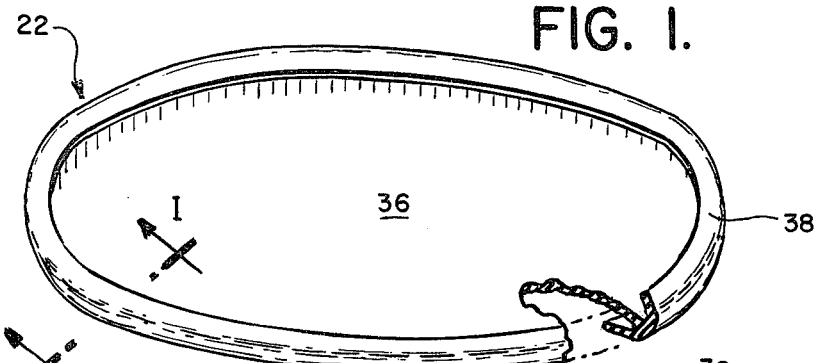
FIG. 1 is a perspective view of a diaphragm for an expansion tank which embodies the features of the invention.

Before explaining the invention in detail it is to be understood that the invention is not limited in its application to the details of construction and to the arrangement of parts specifically illustrated in the drawings since the invention is capable of other embodiments and of being practiced or carried out in various ways. It is to be further understood that the phraseology or terminology employed is for the purpose of description only and not of limitation.

Figure 6:
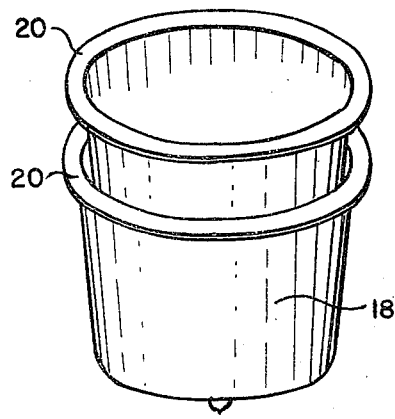
FIG. 6 is a perspective view of a pair of tank shell halves in nested relation for storage or shipment.

Referring to the drawings there is shown an expansion tank 10 formed of a pair of shell halves 12, 14. Each of the shell halves is given a central wall portion 16 which may be substantially flat or slightly rounded or tapered towards the center and a sidewall 18. The sidewall merges at one extremity thereof into the central wall portion whereas the other extremity terminates in a peripherally extending skirt 20. In order that the shell halves may be easily assembled to conserve space during storage or shipment of the tank the sidewalls are desirably given a taper such that the mouth of each shell half is wider than the central wall portion. As a result the halves may be nested one within the other as depicted in FIG. 6. The preferred material for fabrication of the shell halves is steel; however, it will be appreciated that other metals may be employed and it is not outside the scope of the invention to construct the shell halves from a suitable plastic providing it possesses sufficient strength and retains such strength even at elevated temperature since there are systems in which the tank might be used where the liquid chamber of the tank would be at least partially filled with a liquid at a high temperature.

It will be observed that the skirt of each shell half projects outwardly in a direction substantially perpendicular to the plane of the sidewall. The outer portion of the skirt should be substantially straight since it must be capable of insertion into an annular slot in the peripheral edge of the diaphragm 22 as will be described.

Figure 2:
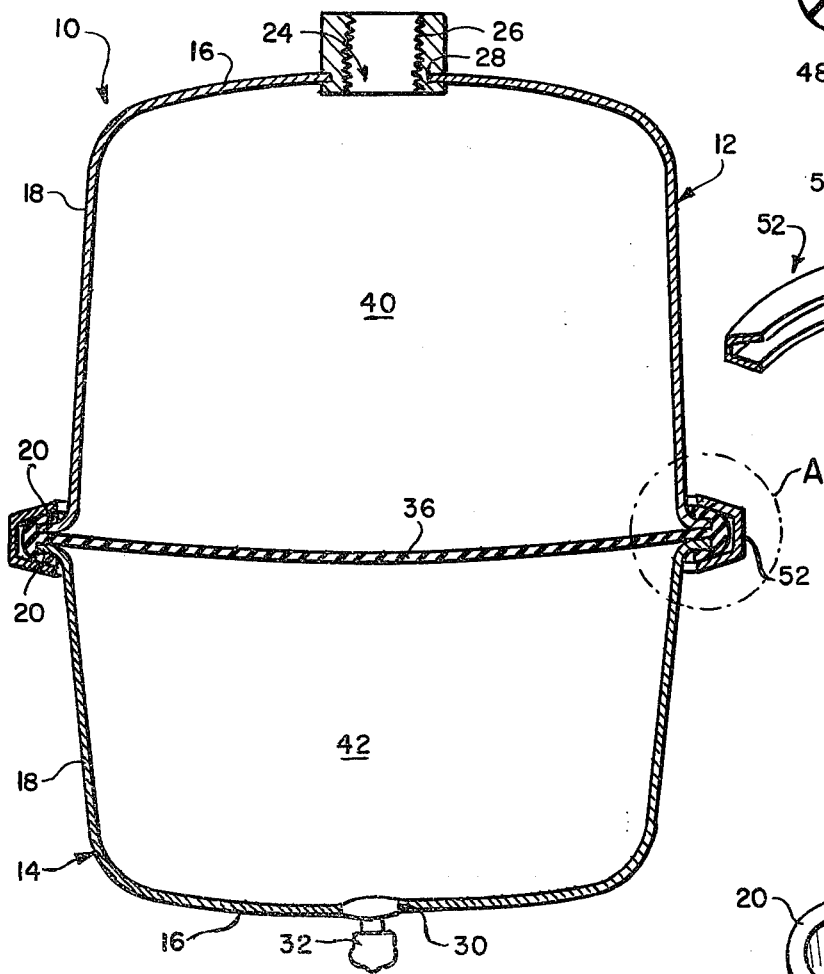
FIG. 2 is a vertical central cross-sectional view of an assembled expansion tank in accordance with the invention.
Figure 5:
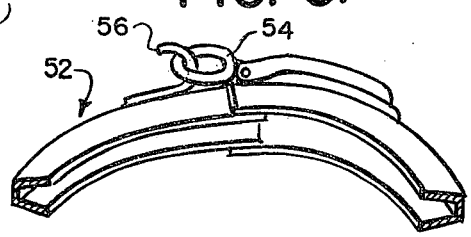
FIG. 5 is a broken perpsective view of the end segments of a V-ring locking member for releasably locking the flanges of the tank shell halves and the diaphragm peripheral edge in joined relation.

As can be seen most clearly from FIGS. 2 and 5, an opening is formed in the central wall portion of each shell half. Thus, in shell half 12 an opening 24 is provided and there is mounted in such opening a generally cylindrical bushing or water fitting 26. It will be noted that the bushing is given a circumferential groove 28, the bushing being thus adapted for mounting in opening 24 by means of a force fit. The bushing or water fitting 26 may be internally threaded to receive a nipple (not shown) so that it may be connected with a source of pressurized liquid. In this manner an interior chamber of the tank is supplied with liquid from the system in which the tank is connected.

Referring again to FIGS. 2 and 5 it will be observed that an opening 30 is formed in the central wall portion of the other shell half 14 and that an air valve 32 is mounted in such opening. In this manner a predetermined minimum air pressure can be maintained within a second interior chamber of the tank. It will be understood, of course, that it is not critical for the water fitting and air valve to be mounted in openings in the central wall portions of the respective shell halves although such location is most desirable.

Referring to FIGS. 1 to 4 there is illustrated a diaphragm 22 formed of an elastomeric material, preferably rubber, consisting of a central sheet portion 16 terminating in a peripherally extending edge 38. The overall diameter of the diaphragm should be adequate to extend from between the skirts of the shell halves as shown in FIG. 2 across the interior of the tank with some additional length in its unstretched state. It will be recognized that various elastomers are suitable for use in fabrication of the diaphragm, the particular material to be selected in accordance with the type of materials, i.e. liquid and gaseous to be admitted into the chambers of the tank. The diaphragm, when secured in sealing relation across the interior of the tank divides the tank into a pair of chambers 40, 42.

The peripheral edge of the diaphragm is formed by a peripherally extending column 44 which is integral with and formed of the same material as the central sheet portion. A pair of flange elements 46, 48 and a central web element 50 are integral with and extend inwardly from the column 44. As can be seen most clearly from FIG. 4 each of the flange elements is spaced from an opposite side of the central web element to form an annular slot therewith. Desirably the column has a thickness at least as great as that of the web element which constitutes an extension of the central sheet.

Figure 4:
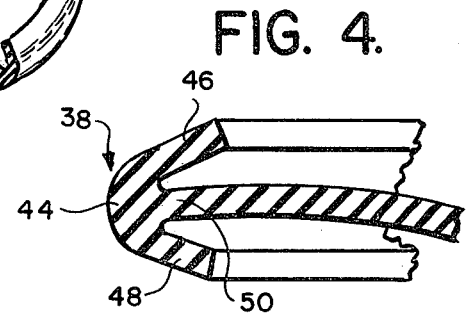
FIG. 4 is a fragmentary cross-sectional view of the peripheral edge of the diaphragm taken along line I—I of FIG. 1.

Referring further to FIG. 4 it will be noted that the flange elements 46, 48 are tapered such that the peripheral edge has a generally V-shaped cross-sectional configuration. Although the diaphragm may be fabricated in any convenient manner the presently preferred procedure is a single step molding process. Persons having ordinary skill in the molding field will require no detailed information as to the parameters of such a molding process so that there is no reason to encumber the present specification with such details.

The expansion tank 10 has been illustrated as having a relatively flat central wall portion 16 and slightly tapered sidewalls 18. It will be understood, however, that each of the shell halves may be contoured to be substantially dome-shaped or hemispheric as described. It should be borne in mind, however, that nesting of the shell halves one within the other is most expeditious when the contour and dimensioning for the central and sidewall portions of each shell half is selected to enable such nesting.

Figure 3:
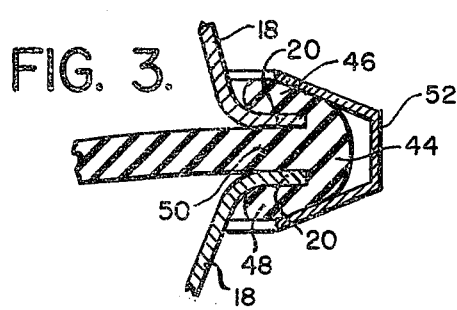
FIG. 3 is an enlarged view of insert A of FIG. 2 showing the relationship between the elements of the joint between the skirts of the tank shell halves.

Referring to FIGS. 2, 3 and 5 there is shown a locking ring 52 which is split at an intermediate location and provided with cooperable locking elements 54, 56 such as a pivotable tongue or strap and loop element respectively. By suitable manipulation of such locking elements the locking ring can be brought into close engagement with the outer surfaces of the flanges 46, 48 of the diaphragm so as to be releasably clamped thereover. In this manner the shell halves and the peripheral edge of the diaphragm are maintained in joined sealing relationship. In order to enhance the close engagement between the locking ring and the flange elements of the diaphragm the cross-sectional configuration of the locking ring is made complementary to that of the peripheral edge of the diaphragm, i.e. V-shaped. It will be recognized that elements 54 and 56 may be any known cooperable locking elements which are capable of selectively clamping the locking ring over the peripheral edge of the diaphragm or releasing the ring from its locking engagement thereover.

It will be clear from FIG. 3 that the skirts of the shell halves are inserted into the annular slots in the peripheral edge of the diaphragm when the shell halves are to be assembled to form the expansion tank and the locking ring is thereafter clamped in locking position over the peripheral edge of the diaphragm. When in such assembled position there will be optimum sealing of the joint between the shell skirts and no protuberances on either the flange elements of the diaphragm or on the skirts which are susceptible to being unseated under the influence of a surge of pressure into one of the chambers of the tank. Further it is possible to so form the flange elements during the molding process so that they are given some degree of pretensioning so as to further enhance the sealing effectivenss of such flange elements in relation to the skirts of the shell halves. Also, although not shown it is within the ambit of the invention to utilize a spacer member between the shell halves when it is desired to increase the capacity of the tank. It will also be appreciated that the configuration of the diaphragm in plan view will resemble that of a plane passing through the center of a sphere although the precise shape of the diaphragm will be dependent upon the shape adopted for the shell halves and will be capable of various configurations.

Although the invention has been described in specific terms it will be understood that various changes may be made in size, shape, materials and in the arrangement of the parts without departing from the spirit and scope of the invention as claimed.

Having thus set forth the nature of the invention, what is claimed herein is:

1. An expansion tank for pressurized fluids comprising:
   first and second shell halves, each of said shell halves including a central wall portion and a sidewall merging at one extremity thereof with said central wall portion and terminating at the other extremity thereof in a peripherally extending outwardly directed skirt; and shell halves being oriented with the said extremities thereof having the respective said skirts facing toward each other, whereby said skirts are generally superposed;
   an opening in one of said shell halves for the passage therethrough of a liquid;
   an opening in the other of said shell halves for the passage therethrough of air;
   a diaphragm formed of elastomeric material extending across the interior of the tank and having a peripheral edge which is between said superposed skirts and said tank shell halves, said diaphragm comprising a central sheet terminating in said peripheral edge, said peripheral edge being formed by a peripherally extending column integral with and formed of the same material as said central sheet and a pair of flange elements and a web element therebetween integral with and extending inwardly of said sheet from said column, each of said flange elements being spaced from an opposed side of said web element to form an annular slot therewith;
   said skirts of said shell halves being releasably and sealingly positioned within respective ones of said annular slots such that said diaphragm divides the interior of the thus formed tank into a pair of chambers sealed relative to each other and relative to the ambient atmosphere external to the tank;
   and locking means for releasably maintaining said shell halves and said peripheral edge of the diaphragm in joined sealing relationship.

2. An expansion tank according to claim 1, wherein said sidewalls of said shell halves are so configured and dimensioned that when separated one of the shell halves can be nested within the other.

3. An expansion tank according to claim 1, wherein said flange elements of said diaphragm are tapered such that said peripheral edge of said diaphragm has a generally V-shaped configuration in cross-section.

4. An expansion tank according to claim 1, including a generally cylindrical bushing having a circumferential groove in the external surface thereof, said opening of said one shell half having a peripheral edge, said bushing being mounted in said opening of said one shell half by means of a force fit between the peripheral edge of the opening and said circumferential groove of the bushing, said bushing being adapted for connection with a source of pressurized liquid.

5. An expansion tank according to claim 4, including an air valve mounted in said opening of said other shell half for the maintenance of a predetermined minimum air pressure within the chamber associated with said air valve.

6. An expansion tank according to claim 3, wherein said locking means comprises a circumferentially extending split ring having a cross-sectional configuration which is complementary to that of the peripheral edge of the diaphragm so as to be selectively clamped into tight engagement thereover.

* * * * *